United States Patent
Zandifar et al.

(10) Patent No.: US 8,156,414 B2
(45) Date of Patent: Apr. 10, 2012

(54) STRING RECONSTRUCTION USING MULTIPLE STRINGS

(75) Inventors: Ali Zandifar, Cupertino, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 1166 days.

(21) Appl. No.: 11/948,410

(22) Filed: Nov. 30, 2007

(65) Prior Publication Data

US 2009/0140892 A1    Jun. 4, 2009

(51) Int. Cl.
*H03M 13/00* (2006.01)
*G06F 11/08* (2006.01)
(52) U.S. Cl. ............ 714/807; 714/2; 714/776; 382/155; 382/156; 704/231
(58) Field of Classification Search .................. 714/776
See application file for complete search history.

(56) References Cited

U.S. PATENT DOCUMENTS

| | | | |
|---|---|---|---|
| 5,008,818 A * | 4/1991 | Bocast | 714/2 |
| 6,700,990 B1 | 3/2004 | Rhoads | |
| 7,158,653 B2 | 1/2007 | Fletcher et al. | |
| 7,188,248 B2 | 3/2007 | Watson | |
| 2002/0124187 A1* | 9/2002 | Lyle et al. | 713/201 |
| 2003/0216912 A1* | 11/2003 | Chino | 704/231 |
| 2009/0022309 A1* | 1/2009 | Vanstone et al. | 380/28 |
| 2009/0180683 A1* | 7/2009 | Lee et al. | 382/156 |
| 2011/0066424 A1* | 3/2011 | Kurzweil et al. | 704/9 |

FOREIGN PATENT DOCUMENTS

WO    2007040112 A1    4/2007

* cited by examiner

*Primary Examiner* — Scott Baderman
*Assistant Examiner* — Justin R Knapp

(57) ABSTRACT

Disclosed are systems and methods for reconstructing a string comprising characters given multiple strings that may contain one or more errors. In embodiments, pairwise comparisons of strings within a set of candidate strings that may contain errors is performed so that measures related to similarity between the strings in each pair may be calculated. In embodiments, an alignment and voting method using at least some of the similarity measures may be employed to generate a reconstructed string. In embodiments, the reconstructed string may be validated, and in embodiments, its characters may be converted to another encoding, if necessary.

13 Claims, 10 Drawing Sheets

200

Perform pairwise comparison of a set of candidate strings and construct matrices of measures related to similarity — 205

Use a voting and alignment method to generate a reconstructed string based on the matrices — 210

Convert the reconstructed string to a message string, if necessary — 215

STRING RECONSTRUCTION USING MULTIPLE STRINGS

BACKGROUND

A. Technical Field

The present invention pertains generally to data processing, and relates more particularly to string reconstruction using multiple strings.

B. Background of the Invention

Systems and methods for communicating data have proliferated over the last several years. And, data communication systems and methods appear to continue to grow in the future. A common feature to all data communication means is that the information typically comprises a number of discrete messages or message components, such as sequences of characters, bits, or other representations of information.

For almost any communication system, errors may be introduced into the sequence of transmitted data characters. Many systems and methods have been devised and implemented to ameliorate the effects of data corruption during transmission and reception. For example, a message may undergo error-correction encoding at the transmission side and error-correction decoding at the receiving side.

Despite the use of one or more means for reducing data corruption, a receiver may still not receive error-free data. For the receiver to understand the information communicated to him or her, it is important that the receiver have the ability to analyze the received data. If the receiver cannot properly analyze the received data, the receiver will likely not correctly understand the communicated information.

SUMMARY OF THE INVENTION

Accordingly, it is an object of the present invention to provide systems and methods for improving the likelihood of properly reconstructing a message given a set of received messages that may contain one or more errors.

Systems and methods are described for reconstructing a string comprising characters given multiple strings that may contain one or more errors. In embodiments, a pairwise comparison of strings within a set of candidate strings that may contain errors is performed so that measures related to similarity between the strings in each pair may be calculated. In embodiments, an alignment and voting method using at least some of the similarity measures may be employed to generate a reconstructed string. In embodiments, the reconstructed string may be validated, and in embodiments, its characters may be converted to another encoding, if necessary.

In embodiments, a method for reconstructing character values of a message string given a plurality of strings comprising characters may comprise identifying common strings of characters between pairs of strings selected from the plurality of strings; identifying similarity measures between the pairs of strings; and, for a location of the message string, determining a reconstructed character value based on a set of candidate character values and a set of exclusion character values and their associated weights obtained using the similarity measures between the pairs of strings. In embodiments, identifying common strings of characters between pairs of strings may comprise, for a pair of strings, determining a longest common subsequence of characters between a first string and a second string.

In embodiments, identifying similarity measures between pairs of strings may comprise, for a pair of strings, calculating a first similarity value weight between a first string and a second string; identifying a first set of character positions in the first string that represent the characters in a longest common subsequence; and identifying a second set of character positions in the second string that represent the characters in the longest common subsequence.

In embodiments, determining a reconstructed character value based on a set of candidate character values and a set of exclusion character values and their associated weights may comprise updating a set of candidate character values by removing any character values that also are included in a set of exclusion character values; selecting a candidate character value associated with a largest similarity value weight of the similarity value weights associated with the candidate character values in an updated set of candidate character values if the updated set of candidate character values contains at least one character value; selecting an exclusion character value associated with a largest similarity value weight of the similarity value weights associated with the exclusion character values in a set of exclusion character values if the set of updated set of candidate character values is an empty set and the exclusion character values contains at least one character value; and assigning a character value to the reconstructed character value if the updated set of candidate character values and the set of exclusion character values are both empty sets.

In embodiments, a candidate character value is added to the set of candidate character values by adding a character value at a location within a first string to the set of candidate character values and associating a first similarity value weight with the character value if the location of the message string is contained with a first set of character positions and the location of the message string is contained with a second set of character positions.

In embodiments, an exclusion character value is added to the set of exclusion character values by adding a character value at a location within a first string to the set of exclusion character values and associating a similarity value weight with the character value if a location of the message string is contained within a first set of character positions and the location of the message string is not contained within a second set of character positions; and adding a character value at the location within the second string to the set of exclusion character values and associating a similarity value weight with the character value if the location of the message string is not contained with the first set of character positions and is contained within the second set of character positions.

In embodiments, a method for reconstructing characters at positions of a message string given a plurality of strings comprising characters may comprise identifying similarity measures between pairs of strings selected from the plurality of strings; for a position of the message string, creating a set of candidate character values and a set of exclusion character values; associating similarity weights with character values in the set of candidate character values and with character values in the set of exclusion character values, and determining a reconstructed character value based on the set of candidate character values and the set of exclusion character values and their associated similarity weights; and updating at least some of the similarity measures responsive to the reconstructed character value. In embodiments, identifying similarity measures between pairs of strings selected from the plurality of strings includes identifying common strings of character values between pairs of strings; identifying sets of common string character positions, where a set of common string character positions for a string represents positions of the character values in the string that are part of a common string of character values obtained using the string; and calculating similarity weights where a similarity weight is associated with a common string of character values.

In embodiments, the step of updating at least some of the similarity measures responsive to a reconstructed character value may comprise, for a reconstructed position and for a pair of strings comprising a first string and second string, incrementing an indicator associated with the second string if a first position in a first set of common character positions for the first string is not equal to a first position in a second set of common character positions for the second string and if the first position in the first set of common character positions is equal to the reconstructed position; incrementing an indicator associated with the first string if a first position in the first set of common character positions for the first string is not equal to a first position in the second set of common character positions for the second string and if the first position in the first set of common character positions is not equal to the reconstructed position; and removing the first position in the first set of common character positions, the first position in the second set of common character positions, and the first character of the common string of character values if the first character value of a common string of character values is equal to the character value at the reconstructed position.

In embodiments, a system for reconstructing character values of a message string given a plurality of string comprising characters may comprise a similarity measurement generator that identifies common strings of characters between pairs of strings selected from the plurality of strings and identifies similarity measures between the pairs of strings; and a string reconstructor that determines a reconstructed character value for a location of the message string based on a set of candidate character values and a set of exclusion character values and their associated weights obtained using the similarity measures between the pairs of strings. In embodiments, the system may further comprise a string converter that converts the characters into message characters.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1A:
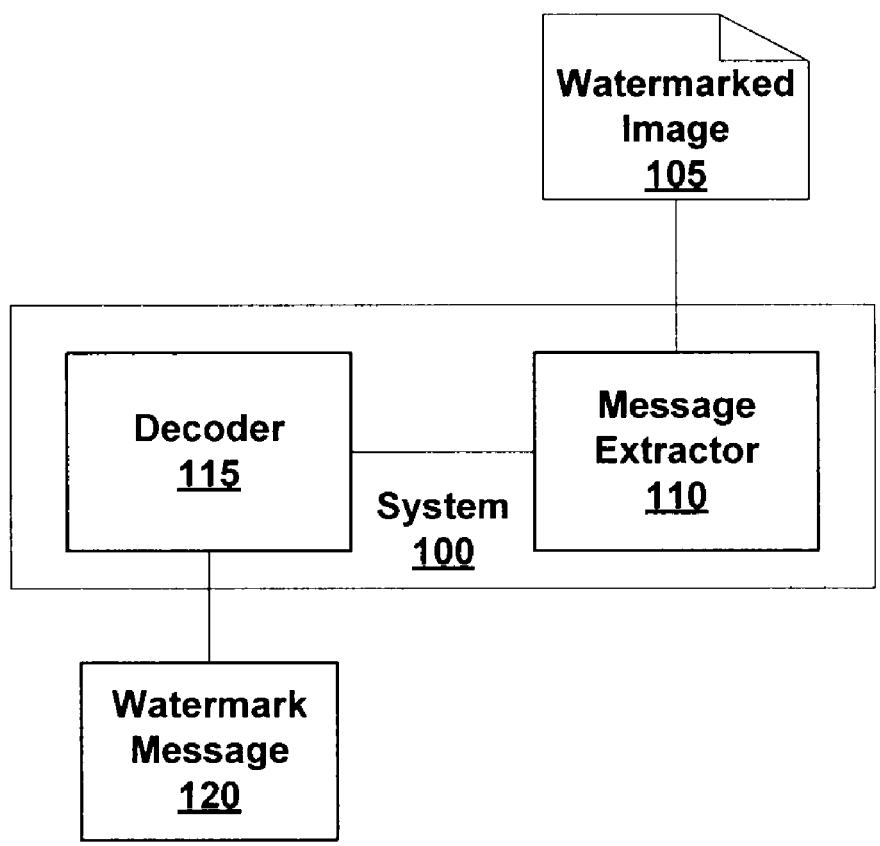
FIG. 1A depicts a block diagram of a system for extracting a watermark message from an image according to various embodiments of the invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, mobile devices, including those devices with a display or camera capabilities, multimedia devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

Systems and methods are described for reconstructing a string comprising characters given multiple strings that may contain one or more errors. In embodiments, a pairwise comparison of strings within a set of candidate strings that may contain errors is performed so that measures related to similarity between the strings in each pair may be calculated. In embodiments, an alignment and voting method using at least some of the similarity measures may be employed to generate a reconstructed string. In embodiments, the reconstructed string may be validated, and in embodiments, its characters may be converted to another encoding, if necessary.

One specific application of the present invention is its use in recovering a bit-encoded message string (hereinafter, a message bit vector) from string segments parsed from a data string extracted from a watermarked image. In embodiments, a plurality of instances of a message bit vector may be embedded into a set of corresponding ordered embedding sites identified in an image, as described in commonly assigned U.S. patent application Ser. No. 11/945,853, entitled "Embedding Data in Images," listing Ali Zandifar, Che-Bin Liu, and Jing Xiao as inventors, filed on Nov. 27, 2007, which is incorporated by reference in its entirety herein. In embodiments, an embedded watermark message may be extracted from an image by extracting and decoding a bitstream (i.e., a set of bit values) from a set of identified and ordered embedding sites in the image, as described in commonly assigned U.S. patent application Ser. No. 11/944,288, entitled "Extracting Data from Images," listing Ali Zandifar, Che-Bin Liu, and Jing Xiao as inventors, filed on Nov. 21, 2007, which is incorporated by reference in its entirety herein.

In embodiments, a bitstream may be segmented by being parsed to extract instances of the message bit vector that may have been written into the bitstream as described in commonly assigned U.S. patent application Ser. No. 11/943,285, entitled "Segmenting a String Using Similarity Values," listing Ali Zandifar and Jing Xiao as inventors, filed on Nov. 20, 2007, which is incorporated by reference in its entirety herein. Since generation of a watermarked image may have modified the image (for example, the watermarked image may be a scanned image), the extracted instances of the message bit vector may contain errors such as, for example, missing or extra bits or swapped bits. In embodiments, an embedded message bit vector may be reconstructed based on similarity measures between pairs of instances of the message bit vector that have been segmented from an extracted bitstream.

A. System Implementations

FIG. 1A depicts a system 100 for extracting a watermarked message 120 from a watermarked image 105 according to various embodiments of the invention. System 100 comprises a message extractor 110 and a decoder 115. In certain embodiments, the watermarked image 105 may have been received from a printer, a scanner, or an electronic file. In embodiments, system 100 shares the encoding and embedding assumptions of the system that generated the watermarked image 105.

Figure 1B:
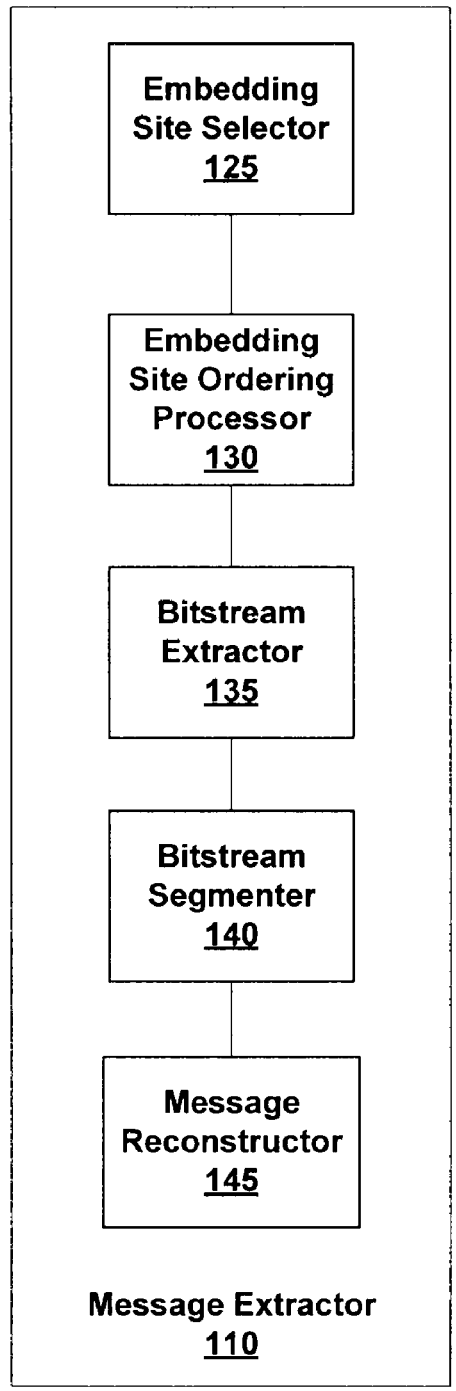
FIG. 1B depicts a block diagram of a message extractor, according to various embodiments of the invention.

In embodiments, message extractor 110 receives a watermarked image 105 and extracts one or more message bit vectors (or portions thereof) that have been embedded within the watermarked image 105. FIG. 1B depicts an embodiment of message extractor system 110 that comprises an embedding site selector 125 that identifies a set of candidate embedding sites in the image; an embedding site ordering processor 130 that orders the candidate embedding sites to form a set of ordered candidate embedding sites; a bitstream extractor 135 that extracts a set of data values from at least some of the set of ordered candidate embedding sites; a bitstream segmenter 140 that segments the set of data values to obtain a plurality of message bit vectors; and a message reconstructor 145 that uses the plurality of message bit vectors to reconstruct an extracted message. In embodiments, message reconstructor 145 may receive a plurality of message bit vectors that have been decoded by embodiments of decoder 115.

Figure 1C:
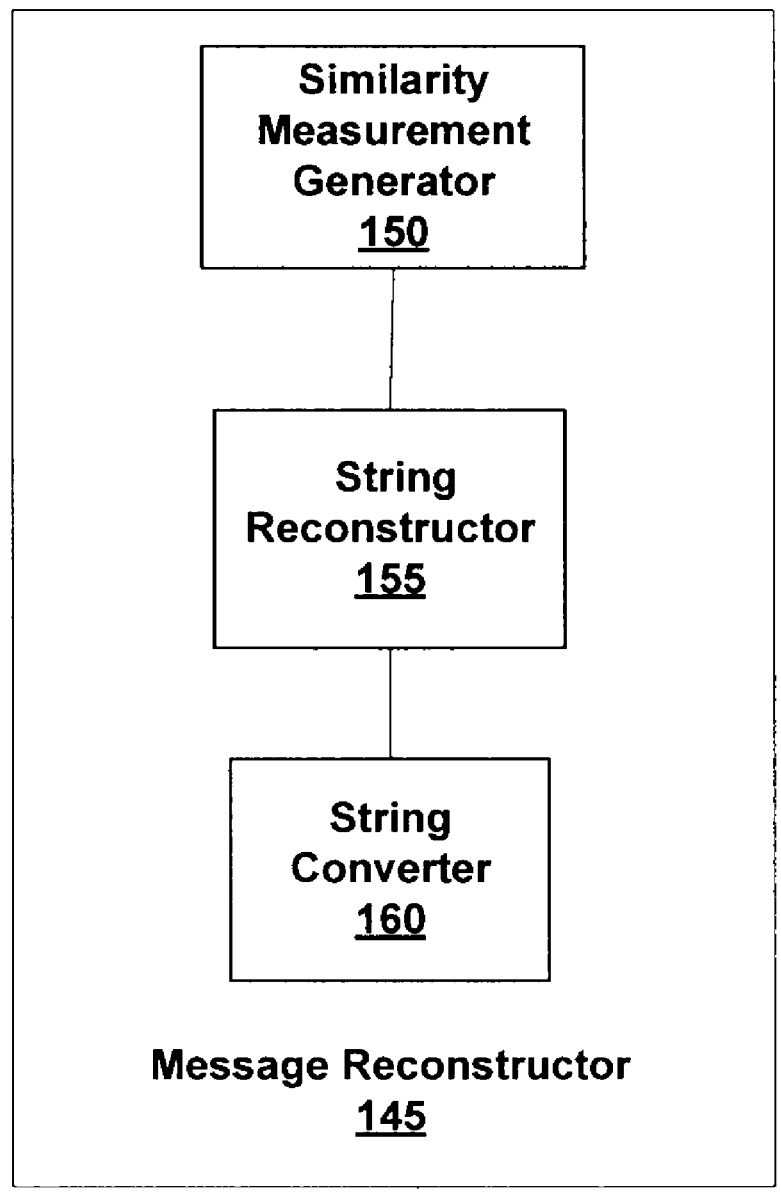
FIG. 1C depicts a block diagram of a message reconstructor according to various embodiments of the invention.

FIG. 1C depicts a message reconstructor system 145 for reconstructing an extracted message according to various embodiments of the invention. System 145 comprises a similarity measurement generator 150, a string reconstructor 155, and a string converter 160. In alternative embodiments, such as for example in cases in which the message string is not further encoded (e.g. bit encoded), a string converter 160 is not included in a message reconstructor system 145. In embodiments, some or all of the functionality of string converter 160 may be performed by embodiments of decoder 115.

In embodiments, similarity measurement generator 150 receives a set of candidate strings, performs a pairwise comparison of strings within the set of candidate strings, and constructs matrices of measures related to similarity between strings within a pair. In embodiments, the set of candidate strings may be a plurality of message bit vectors that have been segmented from a bitstream that has been extracted from a watermarked image.

In embodiments, the similarity between a pair of strings (Str1 and Str2) may be quantified as a similarity value based on the lengths of the longest common subsequence (LCS hereafter) between the strings and the lengths of the strings according to the equation:

$$\text{similarity}(Str2, Str1) = \frac{\text{length}(LCS(Str1, Str2))}{\text{length}(Str1)}$$

where similarity(Str2,Str1) is the similarity value of comparing Str2 to Str1 and LCS(Str1,Str2) is the longest common subsequence between the strings. In embodiments, max (length(Str1), length(Str2)) may be used instead of length (Str1) by policy. For example, a method to compute an LCS is disclosed in Allison, L. and T. I. Dix, "A Bit-String Longest-Common-Subsequence Algorithm," *Inf. Proc. Lett.*, 23:305-310, December 1986, which is incorporated by reference in its entirety herein. Those skilled in the art will recognize that various methods to compare strings exist, and that the choice of comparison method is not critical to the invention.

In embodiments, a set of matrices may be constructed to represent the results of pairwise comparisons between strings in the set of candidate strings. In embodiments, three matrices may be constructed: an LCS matrix in which the LCS computed for the pair of strings is stored for a string; an indLCS matrix in which the set of indices of character positions in a string from the pair of strings representing the LCS from a comparison of the pair of strings is stored; and a similarity LCS matrix in which the similarity value based on the LCS for a comparison of the pair of strings is stored. For example, a comparison of $Str_i$ and $Str_j$ would enter results in the three matrices as LCS(i,j), indLCS(i,j), and similarity LCS(i,j) while the comparison of $Str_j$ and $Str_i$ would enter results in the three matrices as LCS(j,i), indLCS(j,i), and similarity LCS(j, i). LCS(i,j) and LCS(j,i) are equivalent, but indLCS(i,j) and indLCS(j,i) and similarity LCS(i,j) and similarity LCS(j,i) may not be equivalent because each $Str_i$ and $Str_j$ may contain different errors such as, for example, swapped characters or missing characters or extra characters.

In embodiments, string reconstructor 155 receives a set of matrices representing similarity measures taken from pairwise comparisons of the strings in a set of candidate strings and reconstructs a message string based on the similarity measures stored in the matrices. In embodiments, the message string may be reconstructed by using an alignment and voting method based on similarity measures. In embodiments, the character value in a position of the message string may be reconstructed based on the likelihood of each of the candidate strings having the character value at that position.

In embodiments, the candidate strings and the message string may be aligned to the same coordinate system. In embodiments, the results in the matrices LCS and indLCS may be used to assign character values to a candidate list (C-List) and an exclusion list (E-List) while the results in the matrix similarity LCS may be used to associate a similarity value weight with a character value. In embodiments, the reconstructed character value at a position of the message string may be chosen from a character value with the largest weight on the C-List or the E-List.

In embodiments, string converter 160 receives a reconstructed message string and validates and/or converts the reconstructed message string, if necessary. In embodiments in which the embedded message string is known (the "ground truth" message string), it may be compared to the reconstructed message using a similarity measure such as LCS. For example, if LCS is used, a similarity value closer to 1 means that the reconstructed message is more accurate. In embodiments in which the reconstructed message string is itself an encoded string, the characters in the reconstructed string may be converted based on the encoding. For example, in embodiments in which the reconstructed message string is a bit-encoded message string, the bit-encoded message string may be converted to a message string. In embodiments, decoder 115 may perform the decoding.

B. Methods for Reconstructing a String By Using Multiple Strings

Figure 2:
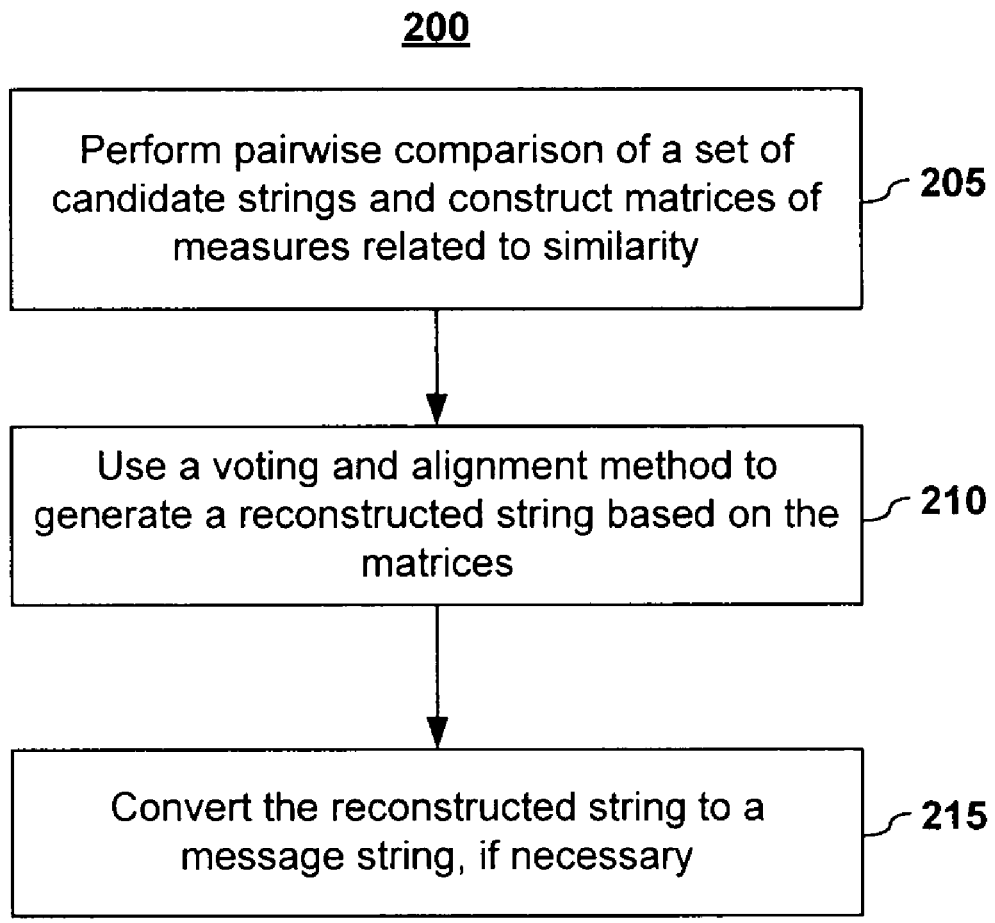
FIG. 2 depicts a method for reconstructing a string using multiple strings according to various embodiments of the invention.

FIG. 2 depicts a method 200 for reconstructing a string comprising characters by using multiple strings according to embodiments of the invention. Method 200 comprises the steps of performing a pairwise comparison of a set of candidate strings and constructing matrices of measures related to similarity (step 205); using an alignment and voting method to generate a reconstructed string based on the similarity measures stored in the matrices (step 210); and converting the reconstructed string to a message string, if necessary (step 215). Method 200 may be implemented by embodiments of message reconstructor 145.

1. Computing Similarity Measures

Figure 3:
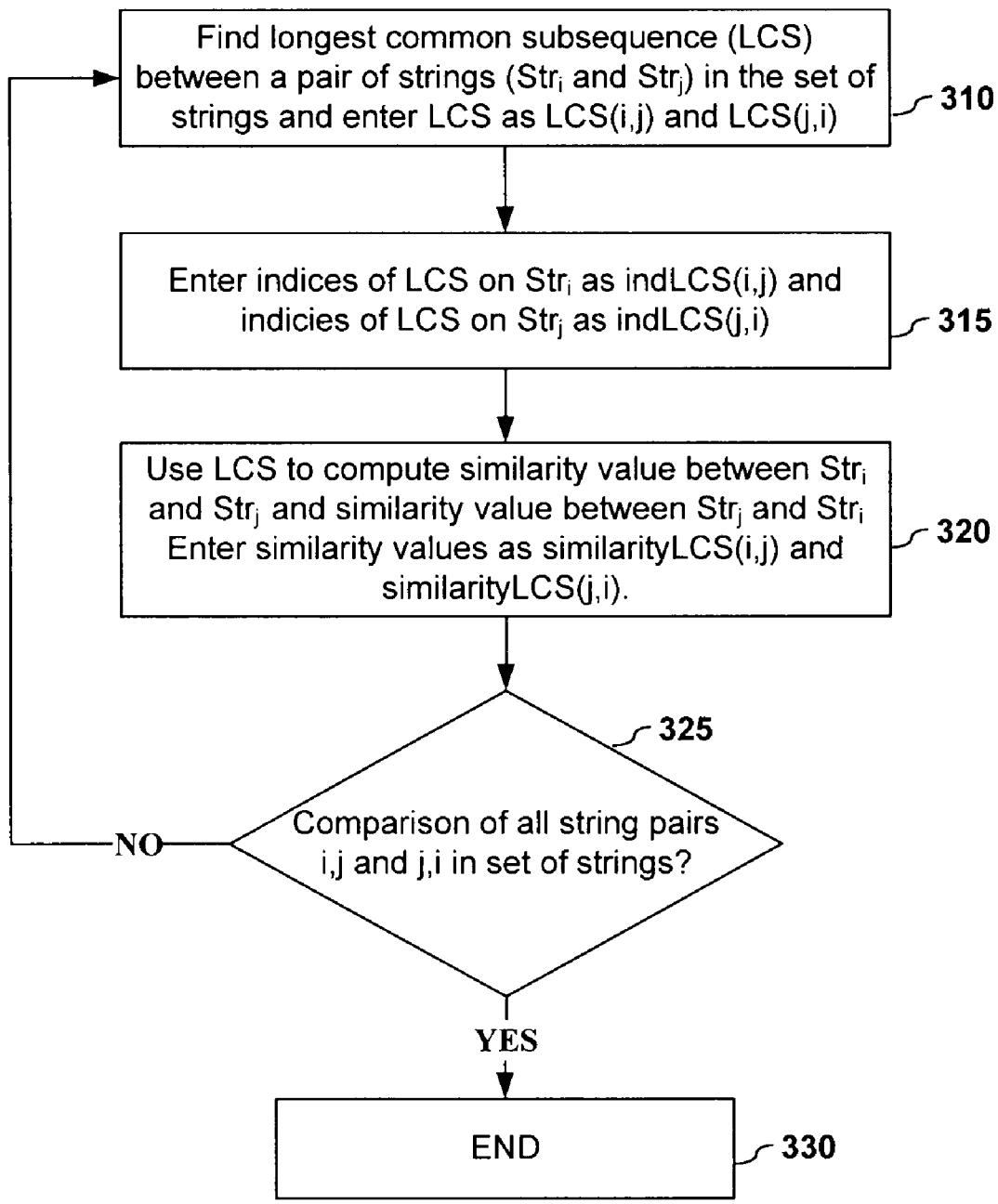
FIG. 3 depicts a method for constructing matrices of similarity measures from pairwise comparisons of strings according to various embodiments of the invention.

FIG. 3 depicts a method 300 for performing a pairwise comparison of a set of candidate strings and constructing matrices of measures related to similarity. Method 300 may be implemented as step 205 in method 200, and in embodiments of similarity measurement generator 150.

In embodiments, the similarity between a pair of strings (Str1 and Str2) may be quantified as a similarity value based on the lengths of the longest common subsequence (LCS hereafter) between the strings and the lengths of the strings according to the equation:

$$\text{similarity}(Str2, Str1) = \frac{\text{length}(LCS(Str1, Str2))}{\text{length}(Str1)}$$

where similarity(Str2,Str1) is the similarity value of comparing Str2 to Str1 and LCS(Str1,Str2) is the longest common subsequence between the strings. In embodiments, max(length(Str1), length(Str2)) may be used instead of length(Str1) by policy. Those skilled in the art will recognize that various methods to compare strings exist, and that the choice of comparison method is not critical to the invention.

In embodiments, a set of matrices may be constructed to represent the results of pairwise comparisons between strings in the set of candidate strings. In embodiments, the results may be entered into three matrices: an LCS matrix in which the LCS computed for the pair of strings is stored for a string; an indLCS matrix in which the set of indices of character positions in a string from the pair of strings representing the LCS from a comparison of the pair of strings is stored; and a similarity LCS matrix in which the similarity value based on the LCS for a comparison of the pair of strings is stored. For example, a comparison of $Str_i$ and $Str_j$ would enter results in the three matrices as LCS(i,j), indLCS(i,j), and similarity LCS(i,j) while the comparison of $Str_j$ and $Str_i$ would enter results in the three matrices as LCS(j,i), indLCS(j,i), and similarity LCS(j,i) (steps 310, 315, and 320). LCS(i,j) and LCS(j,i) are equivalent, but indLCS(i,j) and indLCS(j,i) and similarity LCS(i,j) and similarity LCS(j,i) may not be equivalent because each $Str_i$ and $Str_j$ may contain different errors such as, for example, swapped characters or missing characters or extra characters. In alternative embodiments, similarity LCS(i,j) and similarity LCS(j,i) may be symmetric and equivalent if each $Str_i$ and $Str_j$ may contain different errors if a policy to compute a similarity value using max(length($Str_i$), length($Str_j$)) is followed.

In embodiments, comparisons may be made for all of the string pairs in the set of candidate strings (steps 325 and 330). By way of illustration and not limitation, the following tables illustrate an example, according to embodiments of the invention:

TABLE 1

| | Positions | | | | | | | | |
|---|---|---|---|---|---|---|---|---|---|
| Message | 0 | 1 | 2 | 3 | 4 | 5 | 6 | 7 | 8 |
| [0] | 0 | 0 | 0 | 1 | 0 | 0 | 0 | 1 | |
| [1] | 0 | 0 | 0 | 1 | 0 | 0 | 1 | | |
| [2] | 1 | 0 | 0 | 1 | 1 | 0 | 0 | 0 | 1 |

TABLE 2

| | indLCS | | | | | | | | |
|---|---|---|---|---|---|---|---|---|---|
| LCS | 0 | 1 | 2 | 3 | 4 | 5 | 6 | 7 | 8 |
| (0, 1) | 0 | 0 | 0 | 1 | 0 | 0 | | 1 | |
| (0, 2) | 0 | 0 | | 1 | 0 | 0 | 0 | 1 | |
| (1, 0) | 0 | 0 | 0 | 1 | 0 | 0 | 1 | | |
| (1, 2) | 0 | 0 | | 1 | 0 | 0 | 1 | | |
| (2, 0) | | 0 | 0 | 0 | | 1 | 0 | 0 | 1 |
| (2, 1) | | 0 | 0 | 1 | | 0 | 0 | | 1 |

Table 1 contains a set of three candidate message strings labeled as string [0], string [1], and string [2]. In this example, the strings are bit strings so each string position (labeled from position 0 to position 8) may contain a character value of either 1 or 0. Table 2 represents a set of similarity measures based on LCS taken for each string pair in the set of three candidate message strings. The row LCS(0,1) contains the LCS between string [0] and string [1] (the LCS string would be stored in LCS(0,1)) and also shows the indices of the positions of string [0] in which the LCS characters are represented (the set of these positions is the value that would be stored in indLCS(0,1)). Note that the LCS strings LCS(0,1) and LCS(1,0) are equivalent, but indLCS(0,1) and indLCS(1, 0) are different because string [0] contains one more character than string [1] contains.

2. Reconstructing a String Using an Alignment and Voting Method

Figure 4:
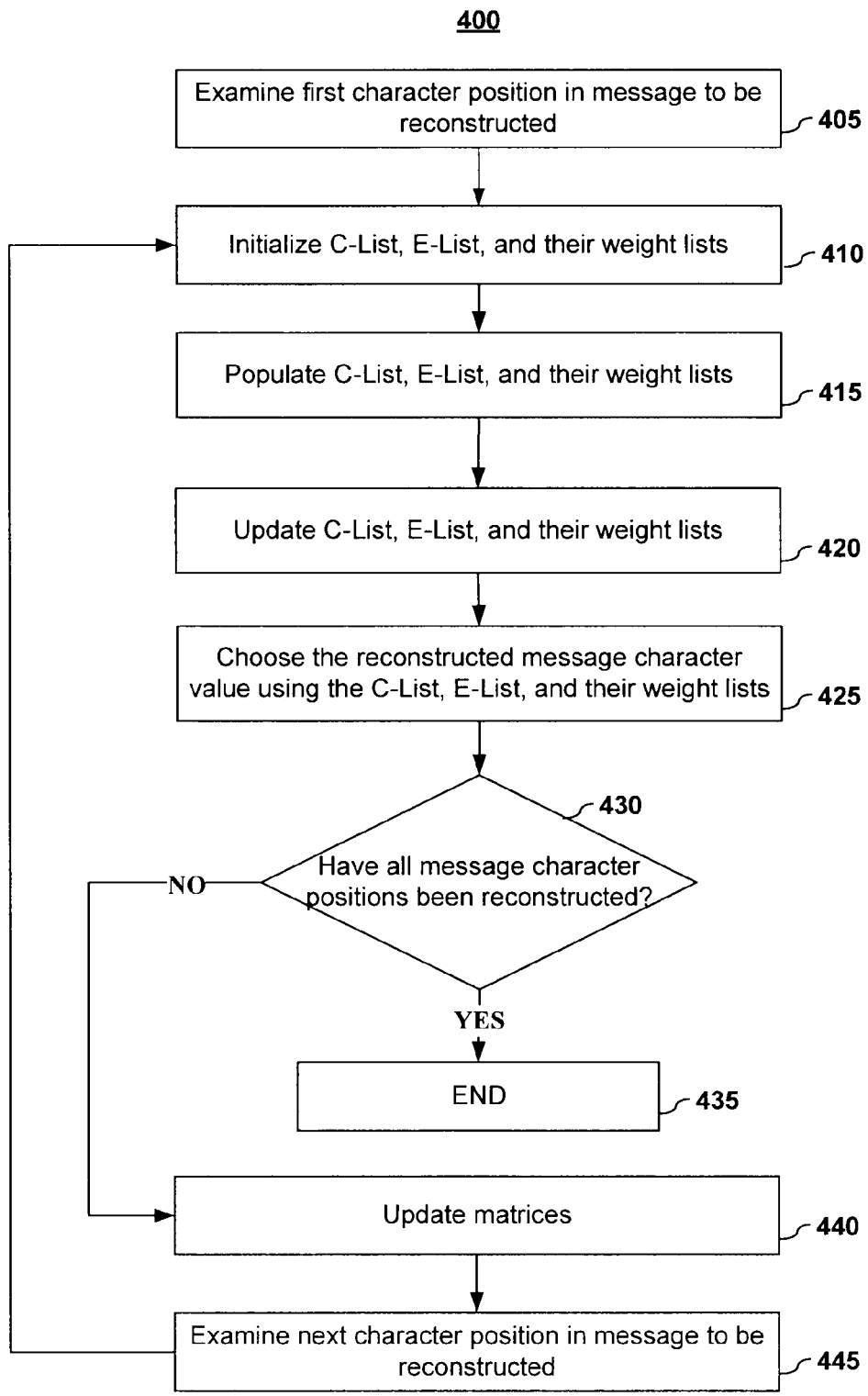
FIG. 4 depicts a method for reconstructing a string based on matrices of similarity measures from pairwise comparisons of strings according to various embodiments of the invention.

FIG. 4 depicts a method 400 for using an alignment and voting method to generate a reconstructed string according to embodiments of the invention. Method 400 may be implemented as step 210 in method 200, and in embodiments of string reconstructor 155.

In embodiments, the message string may be reconstructed by using an alignment and voting method using similarity measures such as LCS, indLCS, and similarity LCS. In embodiments, the character value in a position of the message string may be reconstructed based on the likelihood of each of the candidate strings having the character value at that position. In embodiments, the results in the matrices LCS and indLCS may be used to assign character values to a candidate list (C-List) and an exclusion list (E-List) while the results in the matrix similarity LCS may be used to associate a similarity value weight with a character value.

In embodiments, the character value of each successive position in the reconstructed message string is determined, starting with the first position (e.g. index 0) (step 405) and concluding with the final position (step 430 and step 435) of the reconstructed message. The C-List, E-List, and their associated similarity value weight lists are initialized to the empty set prior to the examination of each position in the reconstructed message string (step 410). In embodiments, the character value(s) may be assigned to the C-List and E-List based on character values in corresponding positions in the candidate strings and their computed LCSs (step 415). In embodiments, the C-List and E-List may be updated after all string pairs have been examined (step 420). For example, in embodiments, if a character value is assigned to both the C-List and the E-List, it is removed from the C-List.

In embodiments, the reconstructed character value at a position in the message string may be chosen from the character value(s) assigned to the updated C-List and the updated E-List based on the character value with the largest associated similarity value weight assigned to a list (step 425). In embodiments, if a single character value is added to a list more than once during list updating, its associated similarity value weight may be the sum of each of its associated similarity value weights. If the C-List is not empty, the character value on the C-List associated with the largest similarity weight may be chosen as the reconstructed character value. If the C-List is empty but the E-List is not empty, the character value on the E-List associated with the largest similarity weight may be chosen as the reconstructed character value. If both the C-List and the E-List are empty, the reconstructed character value may be chosen by a policy. For example, a character value may be selected at random.

After a position in the reconstructed message string is assigned a character value, the matrices may be updated (step 440) prior to the next iteration for the next position in the reconstructed message string (step 445).

3. Populating the C-List and the E-List

Figure 5:
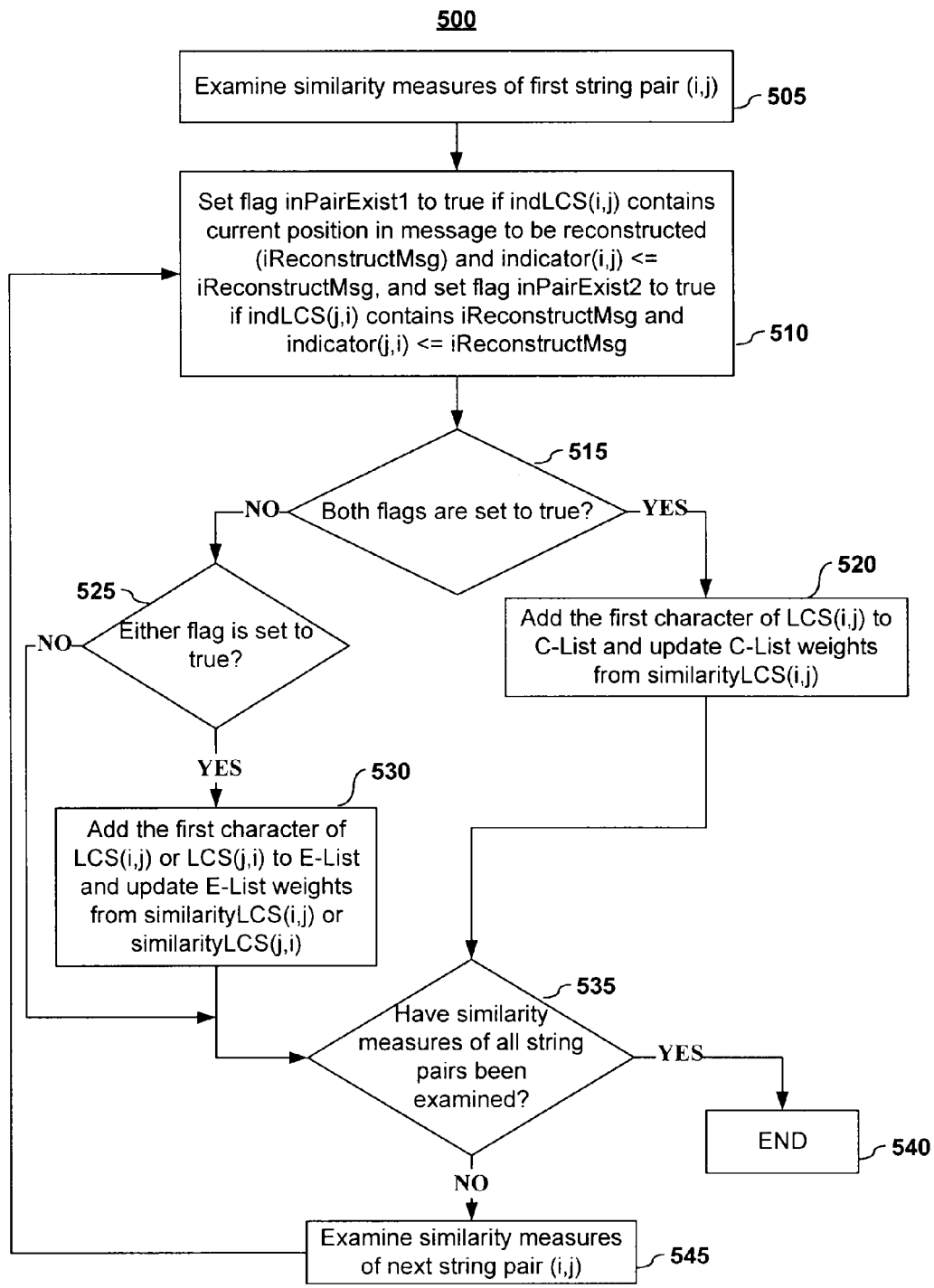
FIG. 5 depicts a method for choosing a reconstructed message character using a candidate list, exclusion list, and their associated weights according to various embodiments of the invention.

FIG. 5 depicts a method 500 for using the similarity measures stored in the matrices to populate the C-List and the E-List according to embodiments of the invention. Method 500 may be implemented as step 415 in method 400.

In this method, the similarity measures of each string pair may be examined to assign character values to either the C-List or the E-List. In embodiments, examining string pairs (i,j), where i is less than j, will result in all string pairs being examined (step 505, step 535, and step 545).

In embodiments, a likely character value from a candidate string for a position (the position termed iReconstructMsg hereafter) in the reconstructed message string is considered to exist if the candidate string's indLCS set of indices contains the current value of iReconstructMsg and the candidate string's associated position with its LCS is considered to be aligned. In embodiments, the existence of a likely character value from $Str_i$ in string pair (i,j) is marked by setting a in PairExist1 flag to true if indLCS(i,j) contains the current value of iReconstructMsg and an alignment indicator(i,j) has a value that is less than or equal to the value of iReconstructMsg. The existence of a likely character value from $Str_j$ in string pair (j,i) is marked by setting a in PairExist2 flag to true if indLCS(j,i) contains the current value of iReconstructMsg and an alignment indicator(j,i) has a value that is less than or equal to the value of iReconstructMsg (step 510).

The example set of candidate message strings and their similarity measures that are illustrated in Table 1 and Table 2 may be used to illustrate the steps of method 500. In this example, the reconstructed message string may have a length of 9, represented by positions 0 through 8. To reconstruct the character value at the first position of the reconstructed message string (iReconstructMsg is assigned the value 0 to represent the first position), we begin by examining the first candidate string pair (0,1) (string [0] and string [1]). Turning to Table 2, we see that indLCS(0,1) is the set {0 1 2 3 4 5 7}, and that set contains the current value of iReconstructMsg. The alignment indicator(0, 1) is 0 (in embodiments, the alignment indicator values are initialized to 0), which also is equal to the current value of iReconstructMsg. Thus, the flag in PairExist1 is set to true. Turning again to Table 2, we examine the similarity measures for string pair (1,0) (string [1] and string [0]) and can see that the flag in PairExist2 also is set to true.

In embodiments, if both in PairExist1 and in PairExist2 are set to true (step 515), the first character value of LCS(i,j) is added to the C-List and the associated C-List similarity value weight list is updated. In an embodiment, the similarity value may be set by policy, e.g. from similarity LCS(i,j) (step 520). In embodiments, $Str_i$ and $Str_j$ may have different lengths so that similarity LCS(i,j) and similarity LCS(j,i) have different values even though the first character of LCS(i,j) and the first character of LCS(j,i) are the same. In embodiments, the similarity value similarity(Str(i,j)) associated with the character value added to the C-List in this case may be calculated based on the string with the maximum length according to the equation:

$$\text{similarity}(Str(i,\ j)) = \frac{\text{length}(LCS(i,\ j))}{\max(\text{length}(Str_i),\ \text{length}(Str_j))}$$

although those skilled in the art will recognize that other policies for choosing the similarity value weight may be chosen.

Turning again to our illustrative example, after examining the string pair (0,1) we would add "0" (the first character value of LCS(0,1)) to the C-List because both in PairExist1 and in PairExist2 are set to true. We also would add the similarity value weight similarity LCS(0,1) to the associated C-List weight list.

In embodiments, if either in PairExist1 or in PairExist2 is set to true (step 525), the first character value of LCS(i,j)/LCS(j,i) and an associated similarity LCS weight are added to the E-List and the associated E-List weights list (step 530).

In our illustrative example, consider the result of examining the string pair (0,2) (string [0] and string [2]) for the likely character value in the first position of the reconstructed message string (iReconstructMsg has the value 0). For the same reasons as previously described, in PairExist1 is set to true for the string pair (0,2). When we examine the string pair (2,0), we find that the set indLCS(2,0) {1 2 3 5 6 7 8} does not contain the current value of iReconstructMsg so we do not set in PairExist2 to true. In this case, we would add the value "0" (the first character value of LCS(0,2)) to the E-List and add a similarity value weight, for example, the similarity LCS(0,2) value, to the associated E-List weight list.

In embodiments, once the C-List and the E-List have been populated for a position iReconstructMsg based on examining all pairs of strings in the set of candidate strings (step 540), then the C-List and the E-List may be updated (step 420 of method 400).

4. Updating the Similarity Measures Matrices

After a position in the reconstructed message string is assigned a character value, at least some of the matrices may be updated (step 440 of method 400) so that the positions being examined may be aligned with the next position in the reconstructed message string. In embodiments, updating the matrices comprises updating an alignment matrix (the indicator matrix) and updating the indLCS and LCS matrices.

a) Updating the Indicator Matrix

Figure 6:
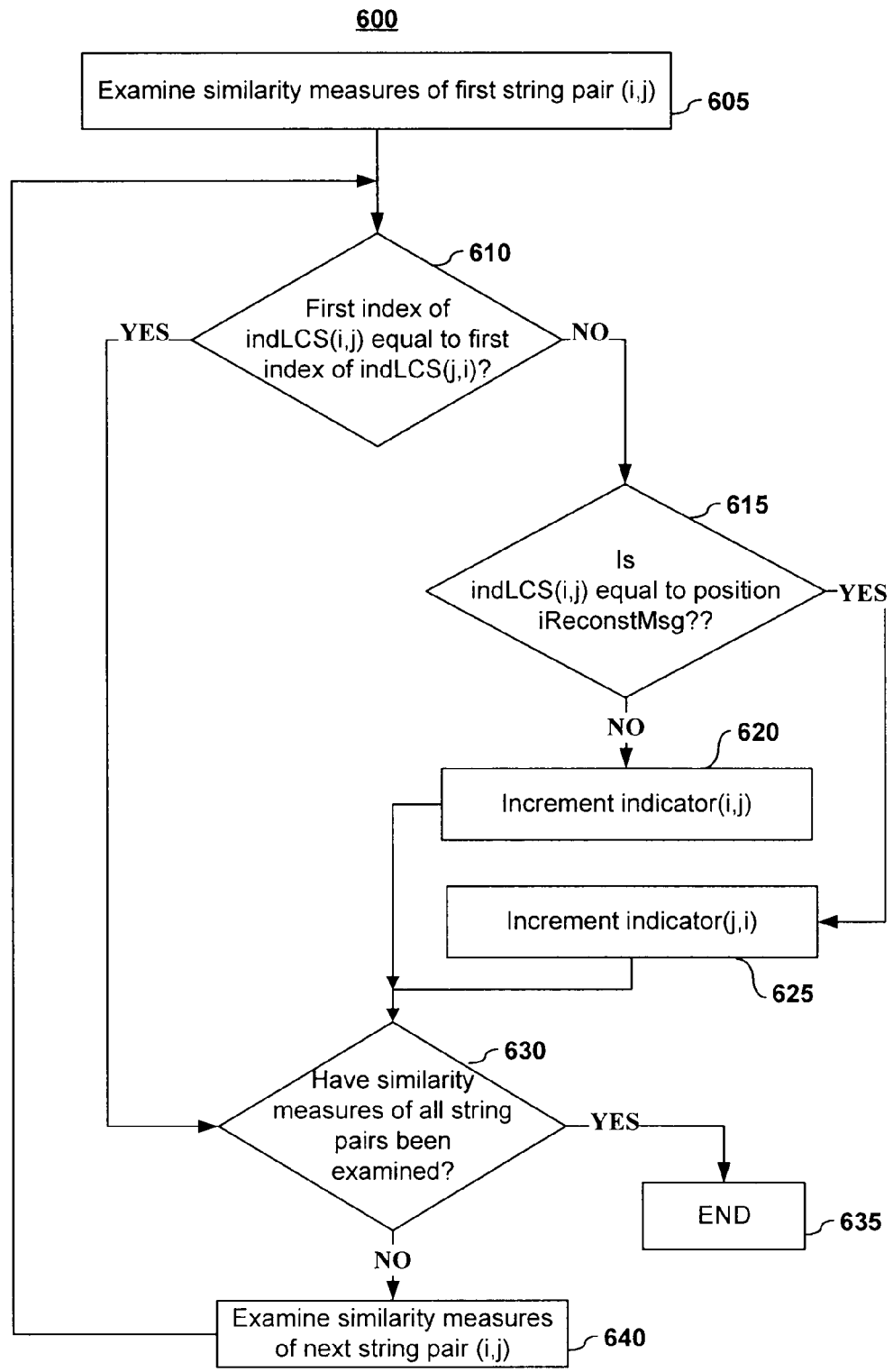
FIG. 6 depicts a method for updating an indicator according to various embodiments of the invention.

FIG. 6 depicts a method 600 for updating the indicator matrix according to embodiments of the invention. Method 600 may be implemented in embodiments of step 440 of method 400.

In embodiments, the LCS for a pair of strings $Str_i$ and $Str_j$ may be represented by different sets of indices in the two strings because there may be different errors in the strings due to, for example, swapped bits or missing or extra bits. Thus, LCS(i,j) and LCS(j,i) may be equivalent but indLCS(i,j) and indLCS(j,i) may not be equivalent. In embodiments, an indicator matrix may be used to align the positions of the strings in a pair with a position that is being examined in the reconstructed message string. In embodiments, an indicator matrix corresponding to the size of the similarity measures matrices is initialized with 0 prior to step 210 of method 200.

In embodiments, the equivalency of indLCS for each pair (i,j) of strings is examined to update the indicator matrix (step 605, step 630, step 635, and step 640). If the first index of indLCS(i,j) is not equal to the first index of indLCS(j,i), the strings need to be aligned (step 610). If indLCS is equal to the current position being examined in the reconstructed string iReconstructMsg (step 615), then indicator(j,i) is incremented (step 625); otherwise, indicator(i,j) is incremented (step 620). In embodiments, while all pairs (i,j) are examined, a flag may be set if an indicator is incremented to insure that it only is incremented once.

b) Updating the Similarity Measure Matrices

Figure 7:
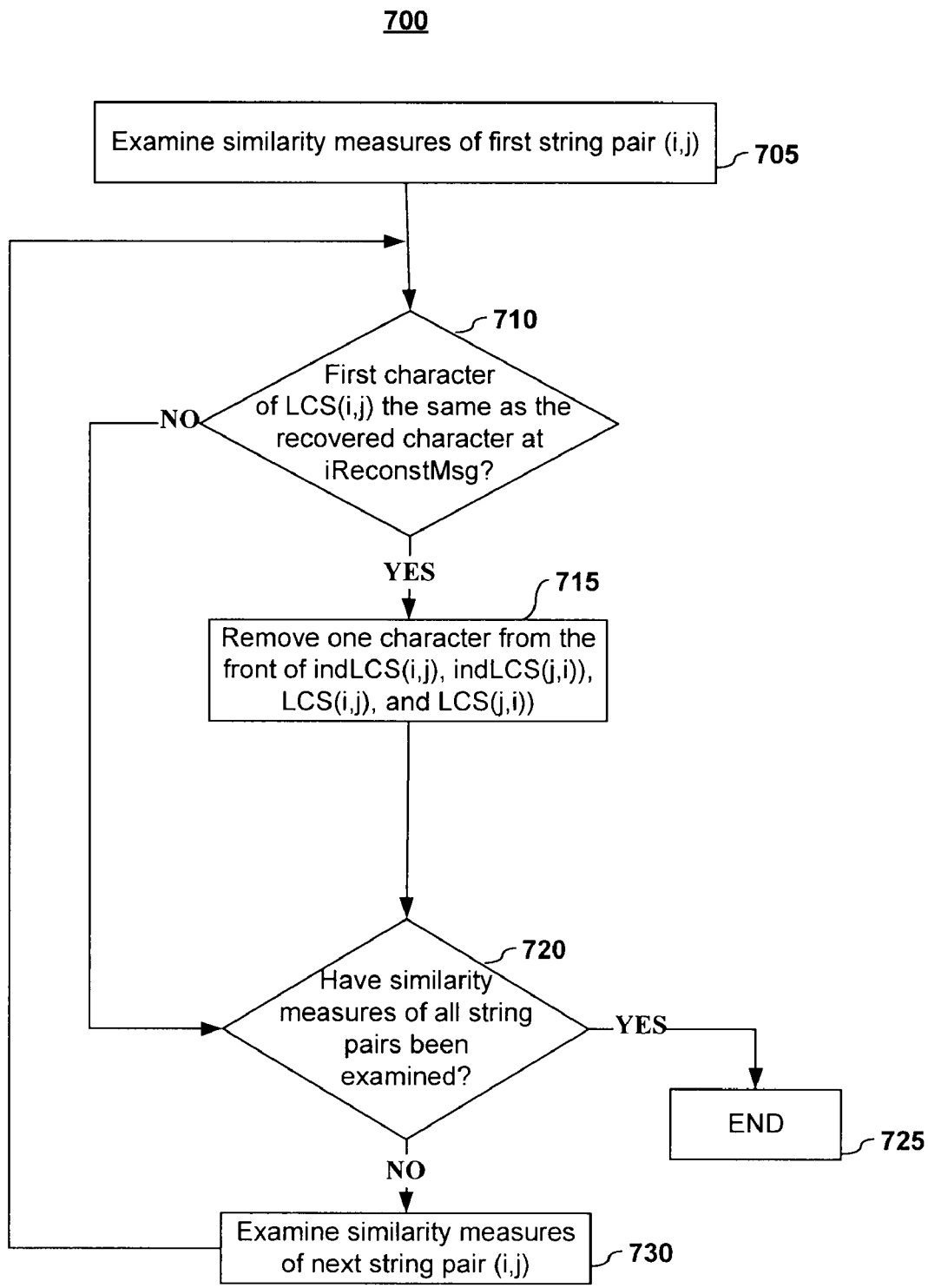
FIG. 7 depicts a method for updating matrices of similarity measures according to various embodiments of the invention.

FIG. 7 depicts a method 700 for updating the similarity value matrices according to embodiments of the invention. Method 700 may be implemented in embodiments of step 440 of method 400.

In embodiments, the positions of the LCSs being examined may be aligned with the current position of the reconstructed message string that is being examined. In embodiments, the indLCS and LCS matrix entries for each string pair (i,j) are examined for alignment (step 705, step 720, step 725, and step 730). In embodiments, all string pairs are examined if each pair (i,j) is examined, incrementing (i,j) where i is less than j. If the first character value of LCS(i,j) is the same as the recovered character at the position of iReconstructMsg in the reconstructed message string (step 710), then one character is removed from the front of indLCS(i,j), indLCS(j,i), LCS(i,j), and LCS(j,i) (step 715).

C. Computing System Implementations

It shall be noted that the present invention may be implemented in any instruction-execution/computing device or system capable of processing the data, including without limitation, a general-purpose computer and a specific computer, such as one intended for data processing. The present invention may also be implemented into other computing devices and systems, including without limitation, a digital camera, a printer, a scanner, a multiple function printer/scanner, a facsimile machine, a multimedia device, and any other device that processes, captures, transmits, or stores data. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 8:
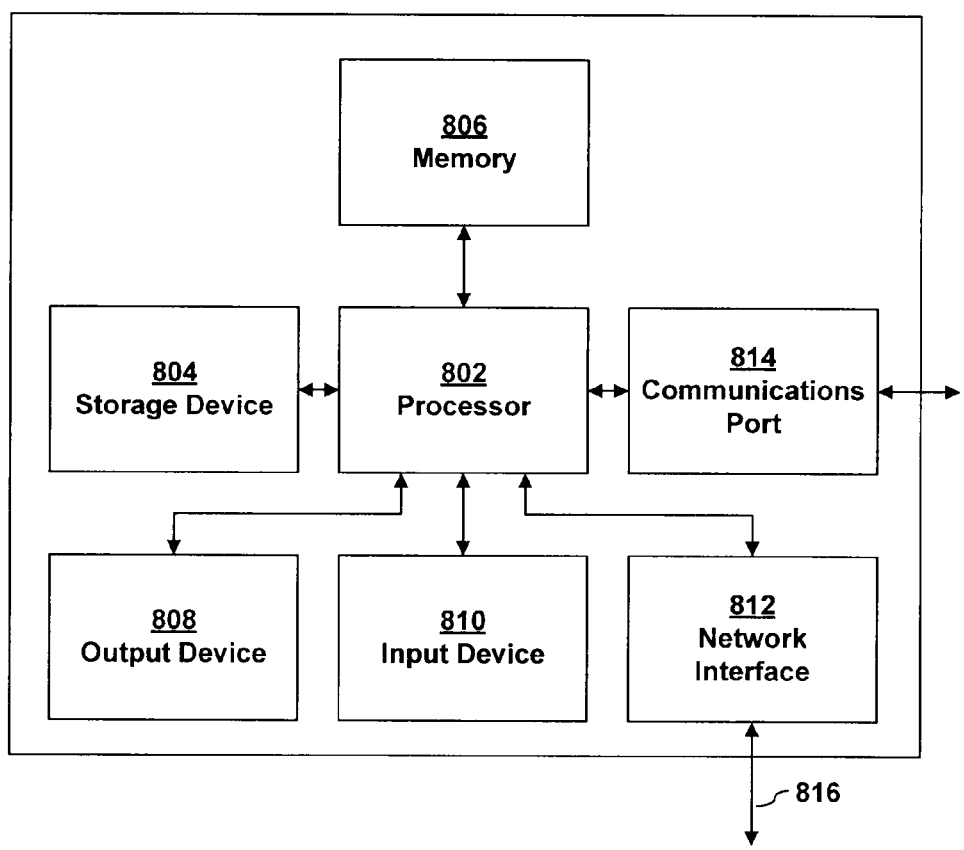
FIG. 8 depicts a block diagram of a computing system according to various embodiments of the invention.

FIG. 8 depicts a functional block diagram of an embodiment of an instruction-execution/computing device 800 that may implement or embody embodiments of the present invention. As illustrated in FIG. 8, a processor 802 executes software instructions and interacts with other system components. In an embodiment, processor 802 may be a general purpose processor such as an AMD processor, an INTEL x86 processor, a SUN MICROSYSTEMS SPARC, or a POWERPC compatible-CPU, or the processor may be an application specific processor or processors. A storage device 804, coupled to processor 802, provides long-term storage of data and software programs. Storage device 804 may be a hard disk drive and/or another device capable of storing data, such as a computer-readable media (e.g., diskettes, tapes, compact disk, DVD, and the like) drive or a solid-state memory device. Storage device 804 may hold programs, instructions, and/or data for use with processor 802. In an embodiment, programs or instructions stored on or loaded from storage device 804 may be loaded into memory 806 and executed by processor 802. In an embodiment, storage device 804 holds programs or instructions for implementing an operating system on processor 802. In one embodiment, possible operating systems include, but are not limited to, UNIX, AIX, LINUX, Microsoft Windows, and the Apple MAC OS. In embodiments, the operating system executes on, and controls the operation of, the computing system 800.

An addressable memory 806, coupled to processor 802, may be used to store data and software instructions to be executed by processor 802. Memory 806 may be, for example, firmware, read only memory (ROM), flash memory, non-volatile random access memory (NVRAM), random access memory (RAM), or any combination thereof. In one embodiment, memory 806 stores a number of software objects, otherwise known as services, utilities, components, or modules. One skilled in the art will also recognize that storage 804 and memory 806 may be the same items and function in both capacities. In an embodiment, one or more of the components of FIGS. 1A through 1E may be modules stored in memory 804, 806 and executed by processor 802.

In an embodiment, computing system 800 provides the ability to communicate with other devices, other networks, or both. Computing system 800 may include one or more network interfaces or adapters 812, 814 to communicatively couple computing system 800 to other networks and devices. For example, computing system 800 may include a network interface 812, a communications port 814, or both, each of which are communicatively coupled to processor 802, and which may be used to couple computing system 800 to other computer systems, networks, and devices.

In an embodiment, computing system 800 may include one or more output devices 808, coupled to processor 802, to facilitate displaying graphics and text. Output devices 808 may include, but are not limited to, a display, LCD screen, CRT monitor, printer, touch screen, or other device for displaying information. Computing system 800 may also include a graphics adapter (not shown) to assist in displaying information or images on output device 808.

One or more input devices 810, coupled to processor 802, may be used to facilitate user input. Input device 810 may include, but are not limited to, a pointing device, such as a mouse, trackball, or touchpad, and may also include a keyboard or keypad to input data or instructions into computing system 800.

In an embodiment, computing system 800 may receive input, whether through communications port 814, network interface 812, stored data in memory 804/806, or through an input device 810, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for reconstructing character values of a message string given a plurality of strings comprising characters, the method comprising:
   providing a processing device for implementing the following steps:
   (A) identifying common strings of characters between pairs of strings selected from the plurality of strings, including, for a pair of strings, determining a longest common subsequence of characters between a first string and a second string;
   (B) identifying similarity measures between the pairs of strings, including, for a pair of strings:
      (i) calculating a first similarity value weight between the first string and the second string;
      (ii) identifying a first set of character positions in the first string that represent the characters in the longest common subsequence; and
      (iii) identifying a second set of character positions in the second string that represent the characters in the longest common subsequence; and
   (C) for a location of the message string, determining a reconstructed character value based on a set of candidate character values and a set of exclusion character values and their associated weights obtained using the similarity measures between the pairs of strings, including:
      updating a set of candidate character values by removing any character values that also are included in a set of exclusion character values;
      responsive to the updated set of candidate character values containing at least one character value, determining the reconstructed character value by selecting a candidate character value associated with a largest similarity value weight of the similarity value weights associated with the candidate character values in the updated set of candidate character values;
      responsive to the updated set of candidate character values being an empty set and the set of exclusion character values containing at least one character value, determining the reconstructed character value by selecting an exclusion character value associated with a largest similarity value weight of the similarity value weights associated with the exclusion character values in the set of exclusion character values; and
      responsive to the updated set of candidate character values and the set of exclusion character values both being empty sets, assigning a character value to the reconstructed character value.

2. The method of claim 1 wherein a candidate character value is added to the set of candidate character values by:
   responsive to the location of the message string being contained within the first set of character positions and the location of the message string being contained within the second set of character positions, adding a character value at the location within the first string to the set of candidate character values and associating the first similarity value weight with the character value.

3. The method of claim 2 wherein an exclusion character value is added to the set of exclusion character values by:
   responsive to the location of the message string being contained within the first set of character positions and the location of the message string not being contained within the second set of character positions, adding a character value at the location within the first string to the set of exclusion character values and associating a similarity value weight with the character value; and
   responsive to the location of the message string not being contained within the first set of character positions and the location of the message string being contained within the second set of character positions, adding a character value at the location within the second string to the set of exclusion character values and associating a similarity value weight with the character value.

4. A non-transitory computer readable medium comprising one or more sequences of instructions which, when executed by one or more processors, causes the one or more processors to perform the method of claim 1.

5. A method for reconstructing characters at positions of a message string given a plurality of strings comprising characters, the method comprising:
   providing a processing device for implementing the following steps:
   identifying similarity measures between pairs of strings selected from the plurality of strings, which similarity measures includes:

identifying common strings of character values between pairs of strings;

identifying sets of common string character positions, wherein a set of common string character positions for a string represents positions of the character values in the string that are part of a common string of character values obtained using the string; and calculating similarity weights, wherein a similarity weight is associated with a common string of character values; and for a position of the message string:

using at least some of the common strings of character values and at least some of the sets of common strings positions to create a set of candidate character values and a set of exclusion character values;

associating similarity weights with character values in the set of candidate character values and with character values in the set of exclusion character values; and determining a reconstructed character value based on the set of candidate character values and the set of exclusion character values and their associated similarity weights; and updating at least some of the similarity measures responsive to the reconstructed character value.

6. The method of claim 5 wherein determining a reconstructed character value based on the set of candidate character values and the set of exclusion character values and their associated similarity weights comprises:

updating a set of candidate character values by removing any character values that also are included in a set of exclusion character values;

responsive to the updated set of candidate character values containing at least one character value, determining the reconstructed character value by selecting a candidate character value associated with a largest similarity weight of the similarity weights associated with the candidate character values in the updated set of candidate character values;

responsive to the updated set of candidate character values being an empty set and the set of exclusion character values containing at least one character value, determining the reconstructed character value by selecting an exclusion character value associated with a largest similarity weight of the similarity weights associated with the exclusion character values in the set of exclusion character values; and responsive to the updated set of candidate character values and the set of exclusion character values both being empty sets, assigning a character value to the reconstructed character value.

7. The method of claim 6 wherein, for a pair of strings comprising a first string and a second string, a candidate character value is added to the set of candidate character values by:

responsive to the position of the message string being contained within a first set of common character positions of the first string and the position of the message string being contained within a second set of common character positions of the second string, adding a character value at the position within the first string to the set of candidate character values and associating a similarity weight with the character value.

8. The method of claim 7 wherein, for a pair of strings comprising a first string and a second string, an exclusion character value is added to the set of exclusion character values by:

responsive to the position of the message string not being contained within one of the first set of common character positions and the second set of common character positions, adding a character value at the position within the first string to the set of exclusion character values and associating a similarity weight with the character value.

9. The method of claim 5 wherein the step of updating at least some of the similarity measures responsive to the reconstructed character value comprises, for a reconstructed position and for a pair of strings comprising a first string and second string:

responsive to a first position in a first set of common character positions for the first string not being equal to a first position in a second set of common character positions for the second string and to the first position in the first set of common character positions being equal to the reconstructed position, incrementing an indicator associated with the second string;

responsive to a first position in the first set of common character positions for the first string not being equal to a first position in the second set of common character positions for the second string and to the first position in the first set of common character positions not being equal to the reconstructed position, incrementing an indicator associated with the first string; and responsive to a first character value of a common string of character values being equal to the character value at the reconstructed position, removing the first position in the first set of common character positions, the first position in the second set of common character positions, and the first character of the common string of character values.

10. A non-transitory computer readable medium comprising one or more sequences of instructions which, when executed by one or more processors, causes the one or more processors to perform the method of claim 5.

11. A system for reconstructing character values of a message string given a plurality of strings comprising characters, the system comprising:

a similarity measurement generator, coupled to receive the plurality of strings, that identifies common strings of characters between pairs of strings selected from the plurality of strings, determines a longest common subsequence of characters between a first string and a second string of a pair of strings, and identifies similarity measures between the pairs of strings, including for a pair of strings:

(i) calculating a first similarity value weight between the first string and the second string;

(ii) identifying a first set of character positions in the first string that represent the characters in the longest common subsequence; and (iii) identifying a second set of character positions in the second string that represent the characters in the longest common subsequence, and a string reconstructor, coupled to receive similarity measures between the pairs of strings, that determines a reconstructed character value for a location of the message string based on a set of candidate character values and a set of exclusion character values and their associated weights obtained using the similarity measures between the pairs of strings, including:

updating a set of candidate character values by removing any character values that also are included in a set of exclusion character values;

responsive to the updated set of candidate character values containing at least one character value, determining the reconstructed character value by selecting a candidate character value associated with a largest similarity value weight of the similarity value weights associated with the candidate character values in the updated set of candidate character values;

responsive to the updated set of candidate character values being an empty set and the set of exclusion character values containing at least one character value, determining the reconstructed character value by selecting an exclusion character value associated with a largest similarity value weight of the similarity value weights associated with the exclusion character values in the set of exclusion character values; and responsive to the updated set of candidate character values and the set of exclusion character values both being empty sets, assigning a character value to the reconstructed character value.

12. The system of claim 11 wherein a candidate character value is added to the set of candidate character values by:

responsive to the location of the message string being contained within the first set of character positions and the location of the message string being contained within the second set of character positions, adding a character value at the location within the first string to the set of candidate character values and associating the first similarity value weight with the character value.

13. The system of claim 11 wherein an exclusion character value is added to the set of exclusion character values by:

responsive to the location of the message string being contained within the first set of character positions and the location of the message string not being contained within the second set of character positions, adding a character value at the location within the first string to the set of exclusion character values and associating a similarity value weight with the character value; and responsive to the location of the message string not being contained within the first set of character positions and the location of the message string being contained within the second set of character positions, adding a character value at the location within the second string to the set of exclusion character values and associating a similarity value weight with the character value.

* * * * *